Aug. 31, 1965 F. ULRICH 3,204,152

TIMING CIRCUIT FOR DEFINING LONG INTERVALS OF TIME

Filed Jan. 11, 1962 2 Sheets-Sheet 1

INVENTOR
FRIEDRICH ULRICH

BY Percy P. Lantzy
ATTORNEY

TIMING CIRCUIT FOR DEFINING LONG INTERVALS OF TIME

Filed Jan. 11, 1962 2 Sheets-Sheet 2

INVENTOR
FRIEDRICH ULRICH

BY [signature]

ATTORNEY 3,204,152
TIMING CIRCUIT FOR DEFINING LONG INTERVALS OF TIME

Friedrich Ulrich, Stuttgart-Bad Cannstatt, Germany, assignor to International Standard Electric Corporation, New York, N.Y., a corporation of Delaware
Filed Jan. 11, 1962, Ser. No. 165,555
Claims priority, application Germany, Jan. 19, 1961, St 17,368
9 Claims. (Cl. 317—142)

The present invention relates to a timing circuit comprising electronic switching means, which may be designed to define long intervals of time. In semi- and fully-electronic switching systems used in telecommunication and telephone systems there are often required central clock-pulse generators suitable for defining very long periods of time, or switching means which only become operative after a predetermined long interval of time. The necessary delay times may be in the order of one minute. Relative thereto reference is only made to a criterion of cutting off a subscriber, or to the bridging of the heating-up period in the case of amplifiers.

Intervals of time of this order cannot be economically realized using conventional relay-type time-delay circuits. These intervals of time, however, can be produced very exactly with the aid of mechanical clocks. Such time-metering and timing devices, however, call for extensive maintenance and are therefore unsuitable for employment with semi- or fully-electronic systems. With respect to the above mentioned fields electronic timing circuits are preferred, because they offer more favorable control possibilities. When combining RC-circuits with the customary types of transistor circuits, it is possible to achieve intervals of time of some tenth of seconds with the aid of handy type of capacitors (below 5 $\mu$f.). Longer intervals of time are obtained in the conventional arrangements from the relatively short basic intervals of time by employing a corresponding frequency division.

To this end there are required multistable circuit arrangements comprising a very large number of steps, such as counting chains of relays, or magnetic counting cores, which are driven by a multivibrator producing the basic interval of time. This, however, increases greatly the expenditure for timing circuits.

It is the object of the present invention to provide a relatively simple type of timing circuit for defining long intervals of delay time. There is to be used a clockpulse generator which, due to the multistable storage property of a series connection of tunnel diodes having different peak currents, is subjected to a multiple utilization in a frequency-divider circuit. According to the invention this is accomplished by a series connection of tunnel diodes having different peak currents being inserted into the output of a monostable trigger circuit; upon reversal of the trigger circuit from the triggered condition into the normal or stable condition, a voltage pulse is produced by the current fluctuation or rise via the peak current of a tunnel diode, by which the trigger circuit is again triggered, and that in the case of a series arrangement of $n$ tunnel diodes the trigger circuit will remain in its normal condition only after $n+1$ cycles of reversal, and will indicate the permanent assumption of this condition. The two individual circuit arrangements, namely the trigger circuit and the frequency-divider circuit, are composed of transistors which are provided in common to both circuit arrangements, so that there results a timing circuit requiring a minimum expenditure. For effecting the new reversal of the monostable trigger circuit it is proposed, in accordance with the invention, that the voltage pulse appearing at the series connection of the tunnel diodes be transferred, via a coupling capacitor, directly to the trigger input of the monostable trigger circuit. According to a further embodiment of the timing circuit the series arrangement of tunnel diodes is coupled to the output of the trigger circuit which is carrying a current when the said trigger circuit is in the stable condition thereof. One particular embodiment of such a timing circuit is characterised in that the time-determining capacitor, which is charged up via the one branch of the trigger circuit, is discharged through a time-determining resistor after the trigger circuit has been controlled by a control pulse, and that subsequent to the discharge of the capacitor there is unblocked a gate circuit coupled to the feedback portion of the trigger circuit so as to reset the trigger circuit, and that subsequent to the resetting of the trigger circuit, the capacitor is recharged, and that simultaneously, the series arrangement of the tunnel diodes is supplied with different peak currents, that a voltage impulse appears as soon as the current rises beyond the value of one peak current, for newly reversing the trigger circuit and thus again initiating the discharge of the capacitor; in the case of a series arrangement of $n$ tunnel diodes, the capacitor is recharged $n$-times, and that subsequent to the ultimate discharge of the capacitor, the trigger circuit is reset to its stable condition, in the course of which there is transmitted an output signal. Due to this additional feedback loop, the discharge circuit of the time-determining RC-circuit can be designed to be substantially of higher ohmic value, because the resetting subsequently to the discharge of the capacitor is initiated by the smallest fluctuations appearing in the feedback portion of the trigger circuit. In accordance with one embodiment of the invention, this feedback is effected via a special feedback transformer. The current fluctuation in the output portion of the trigger circuit comprising the tunnel diodes is correspondingly flattened by an additional inductance, e.g. by the winding of a relay simultaneously serving as an indicator. A further embodiment of the timing circuit according to the invention provides that the time-determining capacitor is in such a way coupled to the feedback portion of the trigger circuit that the charging current which flows when the trigger circuit is in its stable condition, tends to support the feedback (stable condition).

The invention will now be explained in detail with reference to some examples of embodiments shown in FIGS. 1–4 of the accompanying drawings, in which.

Figure 1:
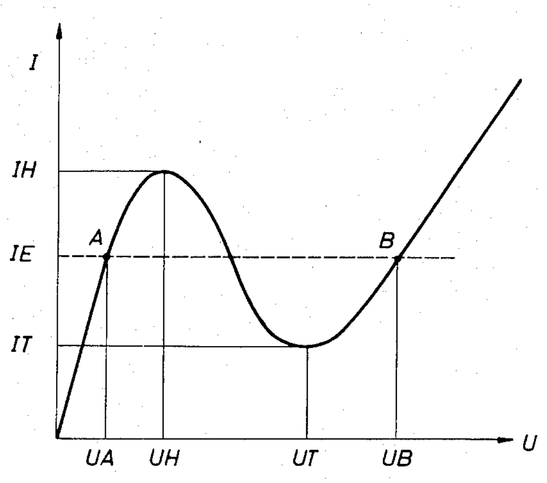
FIG. 1 shows the typical characteristic of a tunnel diode.

FIG. 1 shows the characteristic of a tunnel diode, in the forward direction. In the case of very low voltages the current passing through the tunnel diode will increase strongly and, at a voltage UH, will reach a maximum value, namely the peak current IH. As the voltage increases, the current decreases and reaches its minimum value at the voltage UT, namely the valley current IT, and will then increase continuously. The peak current IH of a tunnel diode is extensively variable in dependence upon different diode designs. It is possible to obtain values ranging from milliamperes to amperes. This current value of the tunnel diode is practically temperature-independent. In the case of a certain imprintment of current IE, indicated in FIG. 1 by the dashline, the tunnel diode is capable of assuming two stable working points A and B. This, however, is only applicable if the impressed current IE is greater than the valley current IT and smaller than the peak current IH. If the current passing through the tunnel diode, e.g. extending from the point A, is increased momentarily in excess of the value of the peak current IH, then the voltage drop across the tunnel diode is suddenly changed to a value which is determined by the magnitude of the current. This voltage dorp, however, is always greater than the voltage UB. If the current decreases again then, in the utmost, the current IE is permitted to flow, so that the working (operating) point B is adjusted by the voltage UB. This potential variation caused by exceeding the peak-current value, depending on the material of the tunnel diode, ranges from 0.4 volt to 1.0 volt.

When arranging in series several tunnel diodes having different peak currents, there is obtained a multistable storage element. This series arrangement consisting e.g. of $n$ tunnel diodes is capable of assuming $n+1$ conditions, starting from the condition in which all tunnel diodes are at the working point A, to the condition in which all tunnel diodes have changed to the working point B. This is effected by the different current flow through the series arrangement.

Figure 2:
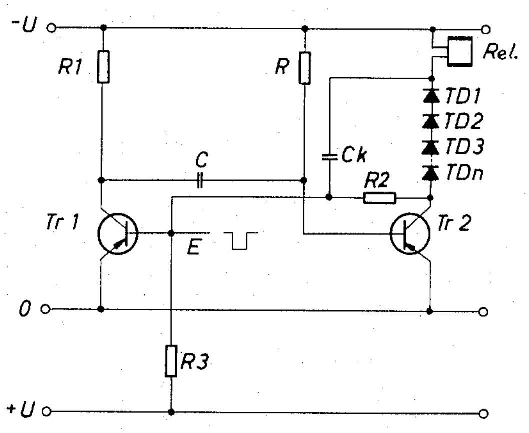
FIGS. 2, 3 and 4 show embodiments relating to timing circuits for defining long intervals of time, all of which always require a different kind of trigger circuit.

FIG. 2 shows one embodiment of a timing circuit according to the invention. The basic idea is as follows:

A control pulse is applied to a monostable circuit which is thereupon reversed, and is reset to the stable condition after a predetermined interval of time. During this resetting there is effected an increase of the current passing through the series arrangement of the tunnel diodes. Upon reaching the value of a peak current, a voltage impulse will appear at the respective tunnel diode, and is applied via a feedback path to the control input of the trigger circuit. On account of this the trigger circuit is again automatically reversed, and the current passing through the chain of tunnel diodes is again reduced. If, after a predetermined interval of time, which is determined by the RC-portion of the trigger circuit, this trigger circuit is returned to its stable condition; the process of the new reversal is repeated until all tunnel diodes have assumed their working points B. By providing such a multistable storage chain consisting of $n$ tunnel diodes, it is possible to obtain a time delay which is $(n+1)$=times greater than the basic time determined by the RC-portion of the trigger circuit. When arranging an indicator, e.g. a relay, in the same current path in which the tunnel diodes are arranged, and where said indicator does not react to the short reversing processes, an output signal will only be obtained if the current in the series arrangement is capable of reaching its final value. This is the case after all tunnel diodes have assumed their operating point B, and when the trigger circuit is no longer reversed automatically. In this final position the control will then have to be effected again by applying an external pulse via the input of the trigger circuit. FIG. 2 shows a trigger circuit composed of the transistors T*r*1 and T*r*2, the reversing time of which is determined by both the capacitance C and the resistance R. In the stable or normal condition the transistor T*r*2 is fully conductive, so that the relay R*el* is energized. The negative control pulse applied to the input E serves to trigger (reverse) the circuit, the transistor T*r*1 is unblocked, and the transistor T*r*2 is blocked. All of the tunnel diodes TD1 . . . TD*n* are deenergized, and the charged capacitor C is discharged via the resistors R and R1. Subsequently to the discharge, the capacitor is momentarily charged up with a reversed polarity, and in the course of this, the transistor T*r*2 is unblocked, while the transistor T*r*1 becomes blocked via the resistors R2 and R3. In the output circuit of the transistor T*r*2 the current starts to increase. As soon as this current exceeds the value of the lowest peak current, e.g. that of the tunnel diode TD1, a voltage impulse will appear at the series arrangement of the tunnel diodes, serving to unblock the transistor T*r*1 via the coupling capacitor C*k*. In the meantime the capacitor C, which was only temporarily charged up to the opposite polarity, is again completely charged to the polarity determined by the stable or normal condition. On account of this a new reversal of the trigger circuit is permitted to take place. Now the discharge process of the capacitor is initiated again. The current flowing in the output circuit of the transistor T*r*2, however, is not completely disconnected. There continues to flow a basic current IE which is greater than the greatest valley current, but smaller than the smallest peak current of the various tunnel diodes. In this way it is safeguarded that the tunnel diodes triggered into the working (operating) point B will remain within this working range. Subsequently to each discharge there is effected both the resetting of the trigger circuit, and the new initiation of the reversal caused by the voltage impulse applied tothe chain of tunnel diodes. This process is repated until the tunnel diode having the highest peak current, has been reversed. During the resetting of the trigger circuit, the current in the output circuit of transistor T*r*2, will increase to its final value, and the indicator, that is, the relay R*el*, will respond. The circuit arrangement will remain in this final condition which also is the stable (normal) condition, until a new control is effected via the input E.

Figure 3:
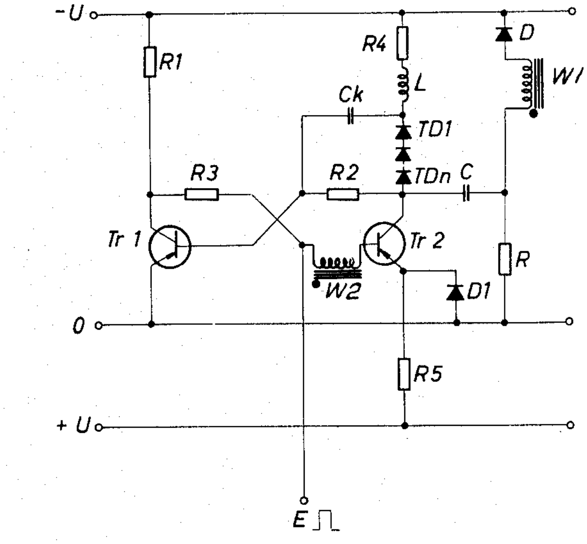

FIG. 3 shows a further embodiment in which the resetting of the trigger circuit is effected subsequently to the discharge of the capacitor C via a specially designed feedback portion. This arrangement has the advantage that the discharge resistance R may be chosen to be of a very high-ohmic value, because the energy required for the resetting of the trigger circuit is taken from another circuit. The normal condition is defined as when the transistor T*r*2 is unblocked, and the transistor T*r*1 is blocked. In this condition the coating of the capacitor C facing the collector electrode of transistor T*r*2, effectively has a zero potential, and the other coating effectively has the negative potential —U. A positive control pulse applied to the input E changes the transistor T*r*2 into its blocked condition. All of the tunnel diodes TD1 . . . TD*n* are reset. The capacitor C starts to discharge across the resistors R4 and R. Since $R>>R4$, the discharge time is effectively determined by the resistor R. During this time no current is permitted to flow via the feedback winding W1, because the diode D is blocked by the voltage applied to the capacitor. Only after the capacitor C has been completely discharged, and thereafter starts to recharge itself with a reversed polarity, does the diode D become conductive and the feedback process initiated. The trigger circuit is returned to its stable condition. In the course of this the transistor T*r*1 is reblocked, and the transistor T*r*2 is unblocked. On account of this the charging of the capacitor is accelerated, and at the same time the chain or series arrangement of tunnel diodes is supplied with current. The current fluctuation in this circuit is delayed by an additional inductance, so that the capacitor C has ample time to be completely recharged. If now the current exceeds the value of one peak current, there will appear the already mentioned voltage impulse which, via the capacitor C*k* and the transistor T*r*1, initiates the reversal of the trigger circuit. Now the capacitor starts to discharge, and the transistor T*r*2 becomes of such an impedance value that at least the aforementioned basic current IE will still flow in the series arrangement. The resetting of the trigger circuit subsequent to the discharge is again effected in the manner described hereinbefore. This process is repeated until all tunnel diodes have entered the area corresponding to the operating point B. An indication may be effected if the additional inductance L is designed as a relay winding, and this relay does not respond to the momentary (temporary) reversing currents. Only after this final condition has been assumed, does the current in the output circuit increase to its final value and there maintained until, there is initiated a new control via the input E, again there is performed the same delay.

Figure 4:
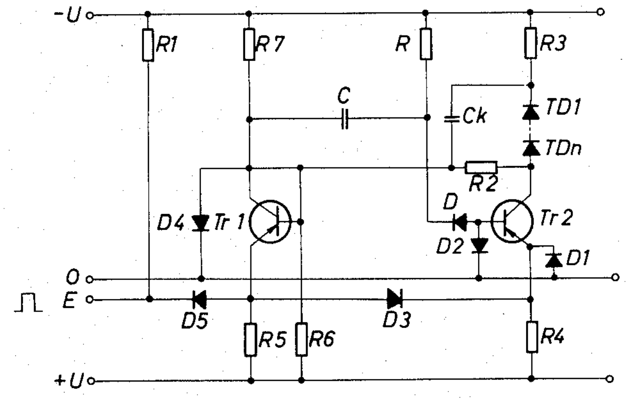

FIG. 4 shows an embodiment in which the control pulse is applied during the entire interval of delay time, and in which an output signal will only appear after the lapse of the interval of delay time, which is obtained in a similar manner as in the examples according to FIGS.

2 and 3. Also in this case the output signal will only remain as long as the control signal is applied. This functioning of the circuit arrangement is accomplished by having in the stable condition (normal condition) an interruption of the additional feedback path which is only active on one side, and in that the effects of the regular static couplings of the transistors Tr1 and Tr2 are suppressed. Accordingly, the emitter electrode of the transistor Tr1 is connected via a diode (gate circuit) D5 and a resistor R1, to the negative pole of the source of voltage —U. In this arrangement the control input E is located at the connecting point between the diode and the resistor. The resistors R1 and R5 are so dimensioned that the emitter potential of Tr1 will be more negative than the base potential. On account of this the diode D3 is blocked, and the additional static feedback is interrupted in this path. In this condition the transistors are blocked. With respect to the transistor Tr2 this means to imply a corresponding current imprintment IE, as already mentioned hereinbefore. Upon application of a positive control voltage pulse to the input E, the diode D5 is blocked, and on account of the potential shift at the emitter of Tr1 which is effected in connection therewith, this transistor will become unblocked. The diode D3 remains blocked as before. There now follows the discharge process of the capacitor C. If this capacitor is completely discharged there is effected the already mentioned trigger process, which serves to restore the trigger circuit, and by the voltage impulse of the tunnel diodes there is effected the new reversal. Upon assumption of the final condition the transistor Tr2 is unblocked, and the transistor Tr1 is blocked. In this condition the diode D5 is in its current-conducting stage, so that this condition will remain until removal of the control voltage from the input E. Only thereafter there is assumed the stable condition (normal condition) in which the transistor Tr1 is blocked and the transistor Tr2 is provided with an impressed basic current IE.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A timing circuit for defining long intervals of time comprising a monostable trigger circuit; triggering means for receiving external signals to said monostable circuit to cause said circuit to assume an unstable condition for a predetermined period of time before returning to its stable state; second means internal to said monostable circuit to produce voltage impulses causing said monostable circuit to switch between stable and unstable conditions a predetermined number of times wherein said second means includes an arrangement of $n$ tunnel diodes, having different peak currents, which are switched in association with current fluctuations to produce voltage impulses, said arrangement of tunnel diodes coupled to the output of the said monostable trigger circuit producing $(n+1)$ cycles of reversal in said trigger circuit before assuming a permanent stable condition; and signal means indicating the permanent resumption of the stable condition after said circuit has switched states a predetermined number of times.

2. A timing circuit according to claim 1 wherein a coupling capacitor is used to transfer said voltage impulses to the input of the said monostable trigger circuit.

3. A timing circuit according to claim 1 wherein said tunnel diodes are coupled to the output of the trigger circuit, said output being in the normally conductive leg of the trigger circuit.

4. A timing circuit according to claim 1 wherein said trigger circuit includes a normally conductive branch comprising a transistor having base, emitter and collector electrodes, a time-determining capacitor connected to said transistor and through which said capacitor is charged, a time-determining resistor connected to said time-determining capacitor through which said capacitor discharges when the said trigger circuit is in the unstable condition, a gate circuit coupled to the feedback portion of the said trigger circuit to reset the trigger circuit to the stable condition when the said time-determining capacitor has discharged a given amount and included in the collector branch of said transistor a plurality of tunnel diodes which in conjunction with the aforementioned time-determining elements produce a plurality of cycles of variation in said trigger cycle between the stable and unstable states subsequent to the application of an external trigger pulse.

5. A timing circuit according to claim 4 wherein said feedback circuit includes a transformer.

6. A timing circuit according to claim 4 wherein the said time-determining resistor is chosen to have a very high resistance.

7. A timing circuit according to claim 2 wherein the said time-determining capacitor is so coupled into the feedback circuit within said trigger circuit that the charging current which flows when said trigger circuit is in the said stable condition tends to support said stable condition.

8. A timing circuit according to claim 4 wherein an inductance is included in the collector branch of said normally conducting transistor to delay the current fluctuations produced in the output circuit by the change in state of the tunnel diode.

9. A timing circuit according to claim 8 wherein said inductance is the control winding of a relay which is insensitive to the small amplitude variations associated with the tunnel diode switching, but which is responsive to the continuous current flowing in said output circuit when said trigger circuit is in the stable condition.

References Cited by the Examiner

UNITED STATES PATENTS

| | | |
|---|---|---|
| 2,949,547 | 8/60 | Zimmerman. |
| 2,979,626 | 4/61 | Pinckaers. |
| 2,994,063 | 7/61 | Gibson. |
| 3,094,631 | 6/63 | Davis. |

OTHER REFERENCES

Sylvan et al.: "Tunnel Diodes as Amplifiers and Switches," reprinted from May 1960 issue of Electronic Equipment Engineering, last (2) pages of the reprint.

Ward: "Tunnel Diode Switch With Amplitude Sensitive Reset," "IBM Technical Disclosure Bulletin," vol. 4, No. 7, December 1961, page 54.

SAMUEL BERNSTEIN, *Primary Examiner.*